Nov. 20, 1928.
W. F. BROWN
1,692,619
LAMINATED GLASS AND PROCESS OF PRODUCING THE SAME
Filed April 26, 1926
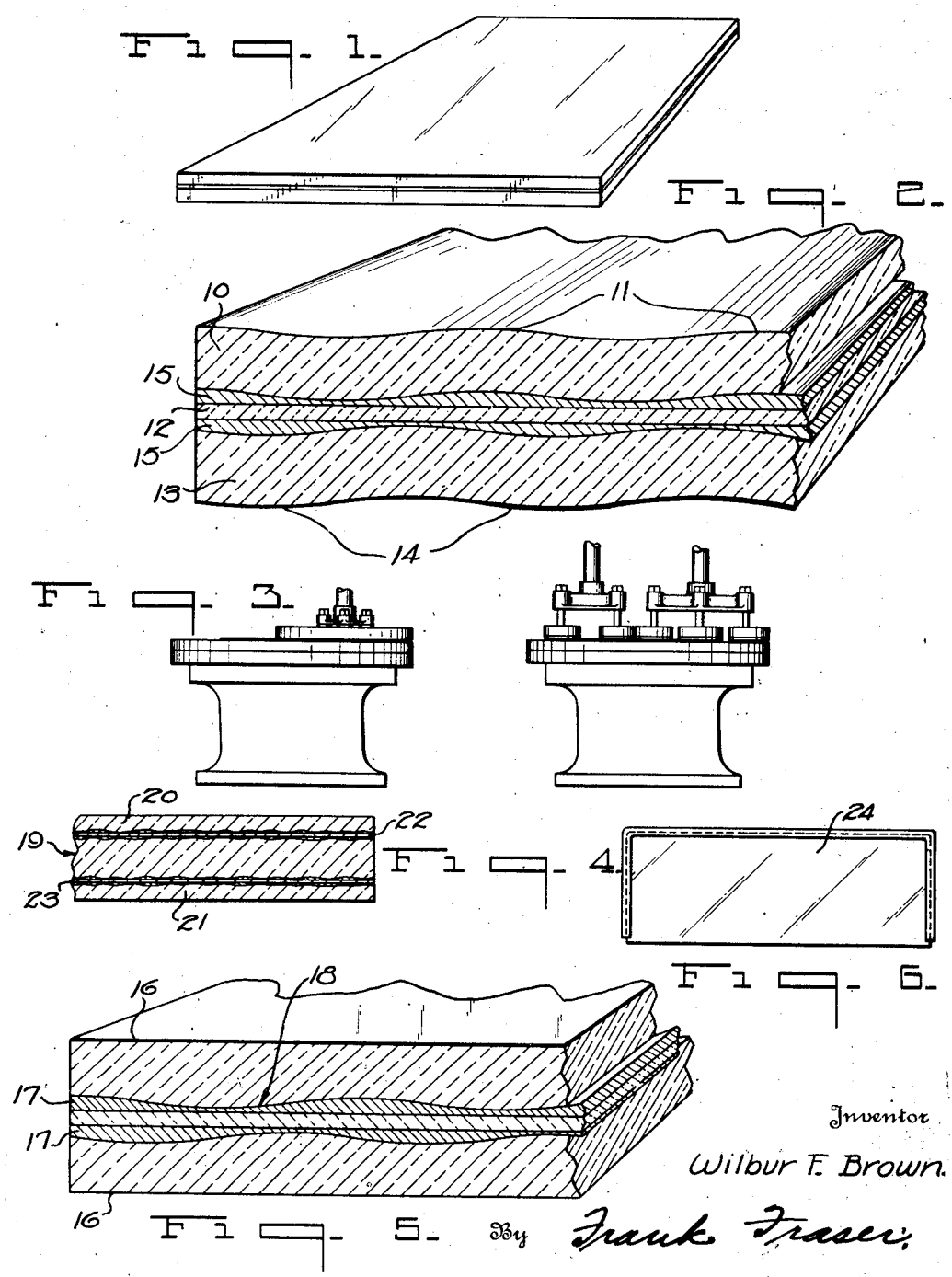
Inventor
Wilbur F. Brown.
By Frank Fraser,
Attorney Patented Nov. 20, 1928.

1,692,619

UNITED STATES PATENT OFFICE.

WILBUR F. BROWN, OF TOLEDO, OHIO, ASSIGNOR TO THE LIBBEY-OWENS SHEET GLASS COMPANY, OF TOLEDO, OHIO, A CORPORATION OF OHIO.

LAMINATED GLASS AND PROCESS OF PRODUCING THE SAME.

Application filed April 26, 1926. Serial No. 104,656.

The present invention relates to laminated glass, and to a new and improved process of producing the same.

An important object of the invention is to produce as a new article of manufacture a sheet of laminated glass, wherein the laminated glass is formed from sheets which normally have slight waves or corrugations therein.

Another important object of the invention is to produce laminated glass from sheets of glass which normally have slight waves therein, the waves in the sheets of glass used being arranged in parallel relationship.

Still another object of the invention is to provide a process of this nature wherein a sheet of laminated glass is produced including two sheets or more of glass which contain slight surface irregularities in the form of waves, the sheet of laminated glass being produced by arranging the sheets of glass that their waves will extend in the same general direction in order that they will be substantially parallel to reduce to a minimum any possible distortion therethrough.

Other objects and advantages of the invention will become apparent during the course of the following description.

In the drawings wherein like numerals are employed to designate like parts throughout the same, Fig. 1 is a perspective view of a finished sheet of laminated glass, Fig. 2 is a fragmentary sectional perspective view illustrating the invention, Fig. 3 represents diagrammatically a sheet glass surfacing apparatus, Fig. 4 is a sectional view of another form of finished product, Fig. 5 is a fragmentary sectional perspective view showing the construction of Fig. 2 slightly modified, and Fig. 6 designates one use to which the finished product may be put.

In the production of sheet glass, in accordance with the various well known processes, slight surface irregularities in the nature of waves are formed. Although these surface irregularities ordinarily are not extremely serious, it is an object of the present invention to produce laminated glass from such sheet glass in a manner that the amount of distortion therefrom will be reduced to a minimum.

In Fig. 2 the numeral 10 designates a sheet of glass. This sheet of glass is illustrated in a manner to exaggerate to a considerable degree the waves 11 present therein. Although to the ordinary eye these waves are not noticeable when such glass is used for window glass purposes, etc., this type of glass differs from plate glass in that the surfaces of plate glass have been ground and polished to remove such irregularities. In the production of sheet glass on the Colburn type of machine, the sheet is very flat and uniform in thickness, but at the same time slight waves are present in the sheet.

In the production of laminated glass two or more sheets of glass are united with a sheet of non-brittle material therebetween. The numeral 12 designates a sheet of non-brittle material such as a cellulose composition material, and is shown as interposed between the sheet of glass 10 and sheet of glass 13. As shown in Fig. 2, the waves 11 in sheet 10, and 14 in sheet 13, are arranged in parallel relationship so that distortion through the sheet as a whole will be practically unnoticeable. It is an easy matter to control the relation of the waves in the sheet of glass, as the waves are formed in the sheet extending in the direction of draw. In other words, the waves extend lengthwise of the sheet and not sidewise.

The sheets of glass 10 and 13 are united to the non-brittle sheet 12 by some suitable binder 15. The outer surfaces 16 of the sheet shown in Fig. 5, may be ground and polished on the machine shown in Fig. 3. In this instance the binding material 17 will fill into any irregularities in the inner surface 18 of the sheet of glass. The index of refraction of the glass, non-brittle material and binder, is such that vision through the finished product will not be distorted, so that any variation in thickness of the binder, as illustrated in Fig. 5, will not be detrimental to the sheet.

In Fig. 4 is shown a sheet of what is known in the art as bullet-proof glass. This bullet-proof glass comprises a central sheet of glass 19, two outer sheets 20 and 21, and two sheets of non-brittle material 22 and 23, the various laminations being united by means of a suitable binder. The sheets are ordinarily united under the action of heat and pressure. As clearly shown in Fig. 4, the inner surfaces of the two outer sheets of glass and both sides of the inner sheet of glass are not ground and polished, and are arranged so that the waves all extend in the same direction.

In Fig. 6 the numeral 24 designates a windshield for use in automobiles using a sheet of laminated glass formed in accordance with the present invention.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. The process of producing laminated glass, consisting in uniting a plurality of sheets of glass having wave formations therein, in a manner that the formations in the sheets of glass extend in substantially the same direction in the finished laminated sheet.

2. The process of producing laminated glass, consisting in uniting a plurality of sheets of glass having surface irregularities therein, in a manner that the irregularities of the sheets are substantially parallel in the finished product.

3. The process of producing laminated glass, consisting in uniting a plurality of sheets of glass, having wave formations therein, and a sheet of non-brittle material, with the wave formations in the sheets of glass extending in the same direction.

4. As a new article of manufacture, a sheet of laminated glass comprising two sheets of glass and a non-brittle membrane interposed therebetween and united thereto, the surfaces of said glass sheets having slight wave formations therein, the formations on each sheet extending in the same general direction, and said sheets being arranged in the laminated sheet in a manner that the wave formations of one sheet are substantially parallel with the wave formations of the other sheet.

5. The process of producing laminated glass, consisting in cutting two sheets of glass having slight wave formations on their surfaces to substantially identical size, arranging an intermediate non-brittle sheet, which has been properly prepared, between the two sheets of glass, which sheets are placed so that the wave formations of one sheet are substantially parallel to the wave formations of the other sheet, care being taken when cutting the sheets to size that the wave formations extend in the right direction, then pressing the sheets together to form a composite structure.

6. The process of producing laminated glass, consisting in cutting two sheets of glass having slight wave formations on their surfaces to substantially identical size, arranging an intermediate non-brittle sheet, which has been properly prepared, between the two sheets of glass, which sheets are placed so that the wave formations of one sheet are substantially parallel to the wave formations of the other sheet, care being taken when cutting the sheets to size that the wave formations extend in the right direction, then pressing the sheets together to form a composite structure, and then grinding and polishing the outer exposed surfaces of the composite structure.

Signed at Toledo, in the county of Lucas, and State of Ohio, this 23rd day of April, 1926.

WILBUR F. BROWN.